Fig. 1

INVENTOR.
FRANK HERZEGH
BY
C. E. Tripp
ATTY.

Oct. 30, 1962  F. HERZEGH  3,060,733
METHOD AND APPARATUS FOR MEASURING TIRE THUMP
Filed Aug. 30, 1957  7 Sheets-Sheet 3

INVENTOR.
FRANK HERZEGH
BY C. E. Tripp
ATTY.

FIG. 16 — 35 P.S.I. VELOCITY MEASUREMENT

FIG. 17 — 50 P.S.I. VELOCITY MEASUREMENT

FIG. 18 — CONCENTRIC RIM VELOCITY MEASUREMENT

FIG. 19 — ECCENTRIC RIM VELOCITY MEASUREMENT

FIG. 20 — BALANCED TIRE VELOCITY MEASUREMENT

INVENTOR.
FRANK HERZEGH
BY C. E. Tripp
ATTY.

United States Patent Office 3,060,733
Patented Oct. 30, 1962

1

3,060,733
METHOD AND APPARATUS FOR MEASURING TIRE THUMP
Frank Herzegh, Cleveland, Ohio, assignor to The B. F. Goodrich Company, New York, N.Y., a corporation of New York
Filed Aug. 30, 1957, Ser. No. 681,198
9 Claims. (Cl. 73—146)

This invention relates to a method and apparatus relating to the phenomenon known as tire thump. Tire thump, as the term will be used here, is a sensation that occurs in synchronism with the revolution of a vehicle's wheels operated on a relatively smooth roadway arising from irregularities in the inflated pneumatic tires. The operator of the vehicle experiences the sensation aptly described as thump when certain irregularities are present in the tires. Vehicle operators have become increasingly aware of tire thump and the elimination of this phenomenon presents a serious problem.

The objective leading to this invention was that of obtaining a measurement of thump in the shop or laboratory which would give exact correlation with the sensation experienced by the vehicle operator running the same tires on the road. There have been a number of proposals for making measurements on the tire. Some of these have been unsatisfactory relative correlation with the vehicle operator's sensation when riding the tires. Prior devices of which I am aware have often unjustly condemned tires which the vehicle operator found to be unobjectionable and conversely they have approved tires which the vehicle operator considered trouble.

The selection of tires that will thump in use is important because it is the first step necessary to make possible a study of the cause and the eventual cure of the difficulty. Proposals have been made to measure the physical deflection of a roller pressed against a rotating tire, to employ inertia or accelerometers to show the location of any irregularity, to employ a microphone pickup and sound analyzer with the measurement displayed on a meter, and to measure sidewall deflection in a rotating tire as a means for measuring tire thump. None of these devices have proven to be entirely satisfactory and they have not come into widespread use in factory quality control of tire production.

The device of my invention embodies the following characteristics all of which are important and which have been found to combine to produce a measurement that correlates accurately with road (riding) tests and, in fact, a device embodying the invention is now employed in quality control of tire production in the various B. F. Goodrich Company factories:

(1) The tire must be inflated and run dynamically under a load. This is accomplished by pressing the tire against a rotating drum.

(2) The tire must be supported by means which closely duplicate the physical characteristics of modern automobiles. In the embodiment of the invention described, this is accomplished by employing a suspension for the tire that is functionally identical with a typical passenger car suspension.

(3) The test must be run at rotational speeds appreciably different from those that excite the suspension into oscillation at its natural frequency.

(4) The measurement should be that of the velocity of displacement of the wheel axis. This is accomplished by mounting a velocity-responsive transducer on the suspension, which in the form tested, is a magnetic loud speaker immersed in oil.

(5) The measurement of thump should be displayed graphically instead of being presented as a series of numbers (readings) to facilitate production use. This is best accomplished by using a cathode ray oscilloscope which gives a graphic display in the form of a polar sweep synchronized with the wheel rotation. As will be demonstrated later, the use of relatively high inertia devices such as output meters provides an indication of thump intensity which gives misleading results.

Other features of my invention are that mechanical parts of the device are relatively simple and virtually standard as are the basic electronic units. Personnel can be readily trained to use the device and a photographic record of each test is simply made.

In addition to the above advantages, I have found the device of my invention enables me to investigate the effects of other irregularities some of which have in the past been believed to cause thump such as wheel unbalance, radial runout of the rim and the amount of maximum displacement of the wheel axis. I have found that the device of my invention, being velocity responsive, does not measure these phenomena and by correlating road tests I have further found that these phenomena do not induce the sensation known as tire thump. I have provided means for calibrating the instrument and for keeping it in calibration so that the instrument can always be relied upon to give uniform results.

The manner in which these advantages may be obtained by one skilled in the art will be apparent from the following detailed description of a preferred embodiment of the invention.

General Description of the Apparatus

Referring to FIGS. 1–4, the apparatus comprises the frame and suspension assembly A which mounts the tire tested T as well as a stationary tire T–1 on the opposite side of the frame, the test tire being driven by a rotating drum D. The results of the test are visually displayed in a display unit U mounted convenient to the apparatus. The frame and suspension unit in the form of the apparatus described was made by cutting the frame of a passenger car vehicle in half to utilize the front suspension, thereby leaving a pair of channels 10 connected by a front cross brace 11, there being added a rear cross bar 12, best seen in FIG. 3. The assembly is pivoted at the rear by extending the rear cross bar 12 into bearings 13 mounted on a pair of stands 14 attached to a platform 15. A suitable load is supplied by weight 16 mounted on top of the frame. The suspension comprises a conventional double wishbone-type independent coil spring suspension. The upper arm 17 is pivoted at its inner end on the shock absorber 18 mounted on the frame, which arm extends outwardly to a vertical link 19. The lower arm or wishbone 21 is pivoted at its outer end to the vertical link 19 and has an inner pivot 22 connecting it to the cross brace 11. Extending from the vertical link 19 is a wheel spindle 23 which carries the usual anti-friction bearings and mounts the freely rotatable hub and flange 24, hub flange 24 being provided with bolts for mounting the wheel in the usual manner. The coil spring 26 is compressed between the spring seat 27 on the lower wishbone 21 and the frame. In order to damp out frame vibrations, auxiliary shock absorbers 28 are pivoted to the frame at 29 and to a lower support 31 mounted on a fixed platform 32. In order to support the suspension when no wheel is mounted thereon a hydraulic jack 33 controlled by a valve 34 is mounted on the platform 32.

Figure 3:
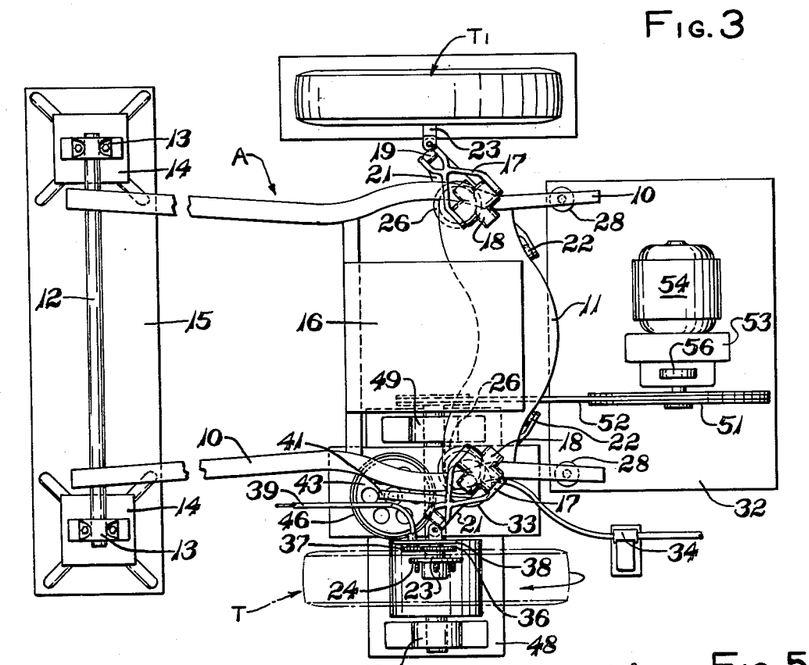
FIG. 3 is a plan view thereof.

As will be explained in more detail presently, means are provided to synchronize the test tire position with the visual display of the test results, which means include a gear 36, as seen in FIG. 3, the gear rotating with the hub flange 24. A pinion 37 is mounted on the vertical link 19 by means of a bracket 38 and meshes with the gear 36 to drive a flexible shaft located in housing 39.

Figure 4:
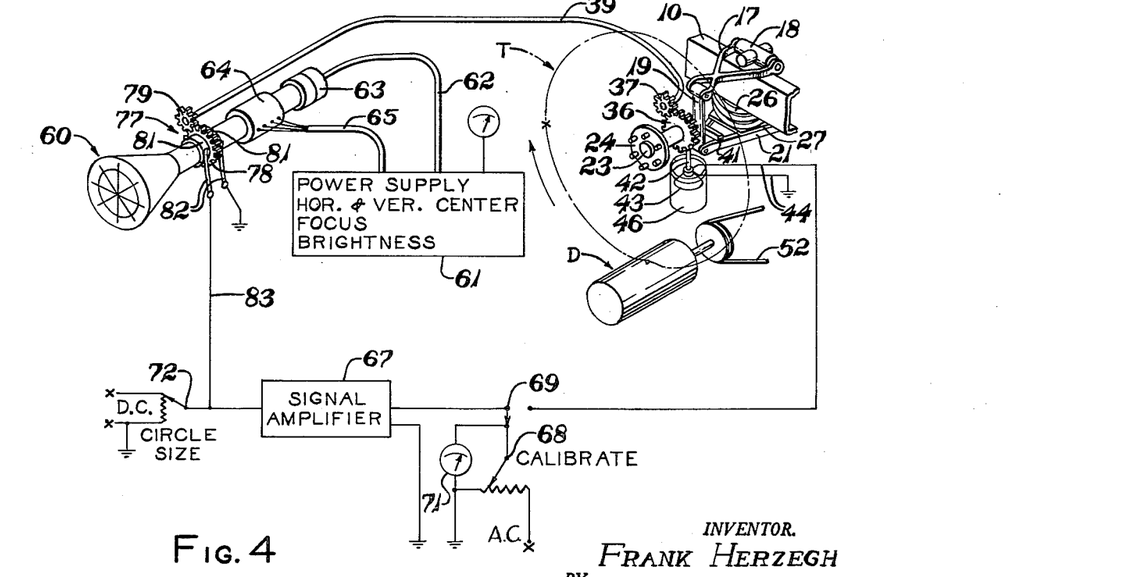
FIG. 4 is a schematic diagram of the system.

A velocity-responsive transducer is mounted directly on the lower wishbone 21 of the suspension by a support bar 41, best seen in FIGS. 3 and 4 from which depend a support rod 42 that mounts the transducer 43.

In the form of the apparatus described, the transducer is an ordinary 5" round permanent magnet speaker. The support 42 in this form is connected to the frame of the speaker which carries the permanent magnet. The voice coil is mounted on the usual flexible diaphragm and the voltage generated is brought out by leads 44. In order to cause relative motion of the voice coil and magnet during the test, the container 46 is filled with oil 47 and the speaker is immersed in the oil. I have found that ordinary lubricating oil is suitable, but that the viscosity of the oil is not critical, for the device operates satisfactory in oils ranging from grades SAE 10 to 80. With this arrangement relative motion of the suspension to the platform results in displacement of the voice coil relative to the magnet in the speaker due to the mass of oil which surrounds the diaphragm, thereby giving an output voltage signal that has been found to be closely proportional to the velocity of suspension displacement. This arrangement has two important advantages. First, the oil provides a reaction to motion of the speaker diaphragm and coil, yet the oil will damp out diaphragm resonance. Second, the zero or neutral position of the speaker is self-establishing so that when the jack 33 is operated for changing wheels, no manipulation of the transducer is required, nor is any adjustment required when testing tires of different diameters because so long as the speaker remains immersed in the oil it establishes its own neutral or zero position.

In order to rotate the tire under load, the test platform 48 rotatably mounts the drum D by means of bearings 49. A small pulley is mounted on the inward end of the drum shaft and is driven by a large driving pulley 51 and V-belts 52. The drum is driven at a selected speed through a combined speed reducer and variable speed drive 53 fitted to an electric motor 54. A tachometer 56 is connected to the driving mechanism for the drum which gives a visual indication of the drum speed.

General Principle of Operation

Figure 1:
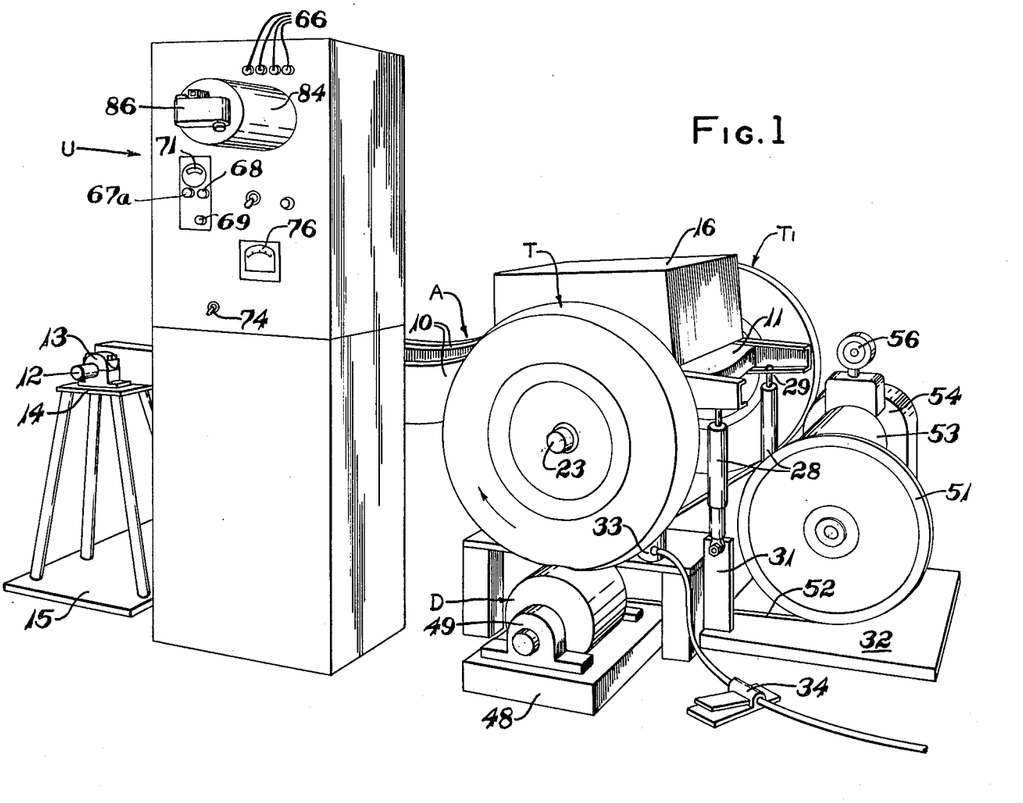
FIG. 1 is a general view of the apparatus with a tire mounted for testing.
Figure 2:
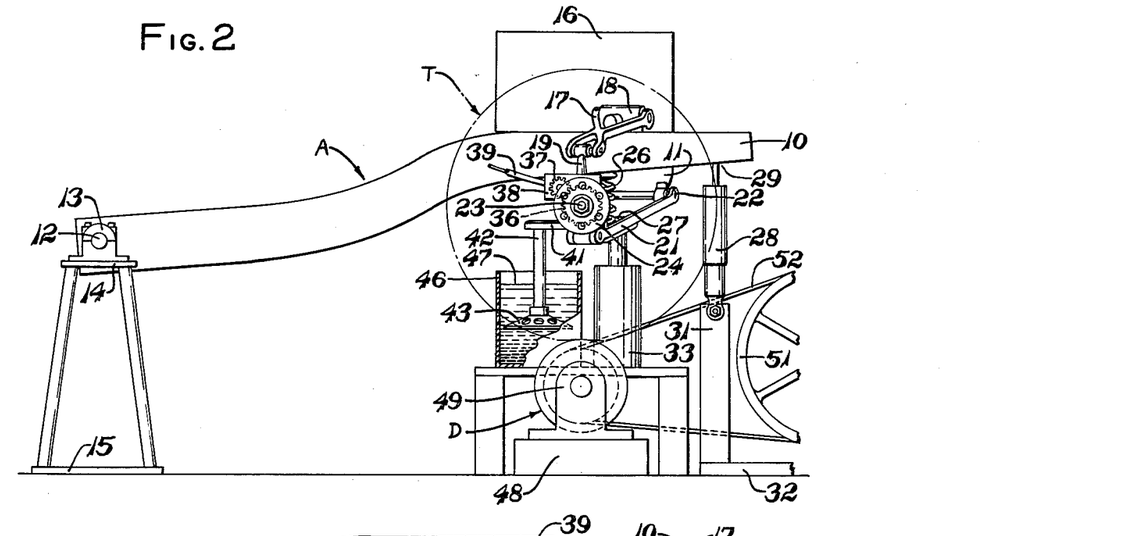
FIG. 2 is a side view of the frame suspension with the tire removed.

In order to provide an inertialess response to the signal that gives a graphic display of the test, cathode ray tube type of equipment is employed, the tube having a rotary or polar sweep. Referring to FIG. 4 which is a schematic drawing of the system, the cathode ray tube is shown at 60 and is provided with a long persistence screen. The usual power supply 61 is provided in order to supply the various voltages required for tube operation, such power supplies being well-known to those skilled in the cathode ray tube art. The usual leads 62 extend to the base socket 63 of the tube and the tube employed is of the magnetic deflection type having horizontal and vertical deflection coils and a focus coil indicated generally at 64. The leads 65 from these coils 64 likewise receive the proper voltage from power supply 61. The usual controls 66 provide for horizontal and vertical centering of the trace, focus, and brightness, these being of conventional nature. As seen in FIG. 1, these controls 66 are located at the upper part of the display unit U.

The velocity voltage signal from the transducer is amplified by a signal amplifier 67, the amplification being controlled by a gain control 67a, seen in FIG. 1. In order to calibrate the signal amplifier an A.C. voltage is provided, as seen in FIG. 4, by means of a calibration potentiometer 68 and a calibration switch 69. The selected A.C. voltage may be applied to the amplifier and read on the meter 71. The trace of this voltage is visible on the screen of the cathode ray tube. In order to adjust the diameter of the circular trace on the tube screen, a D.C. voltage is supplied through potentiometer control 72 to the deflection yoke of the tube. As seen in FIG. 1, a switch 74 is provided for turning on the power supply and a meter 76 gives the electron gun or cathode voltage of the cathode ray tube.

As mentioned, the oscilloscope has a polar or rotary sweep and in the form of the invention described a magnetic deflection coil that is mechanically rotated is employed. The deflection yoke 77 is mounted for rotation about the neck of the tube, and it is driven by a gear 78 on the yoke meshing with a pinion 79 connected to the other end of the flexible shaft. The gearing is such that the deflection coil rotates at exactly the same speed as does the tire under test. In order to apply the signal to the deflection yoke, a pair of slip rings 81, 81 is provided, only one being visible in FIG. 4. Contactors or brushes 82 engage each slip ring, one brush being grounded and the other being connected by lead 83 to the circle size determining D.C. voltage as well as to the output of the signal amplifier. The output of the signal amplifier, which is intended to supply only an A.C. thump signal, is fed to the deflection yoke through a blocking condenser in order to isolate the thump signal voltage from the D.C. circle size control voltage. As seen in FIG. 1, a portion of the cathode ray tube projects from the control channel and is surrounded by a shield 84 and which mounts a camera 86. The camera is of the single reflex type so that the trace can be observed through the camera view range finder without parallax. This arrangement also permits a photograph of each test to be made without removing the camera.

An electrostatic cathode ray tube can also be employed in which case the deflection coil would be replaced by electrostatic deflection plates containing sine-cosine voltages synchronized with the tire rotation.

*Principle of the Rotating Trace*

Figure 4A:
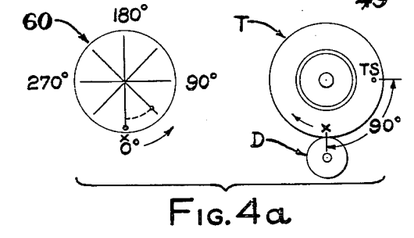
FIGS. 4a and 4b are diagrams of the synchronization of the tire and oscilloscope trace.
Figure 4B:
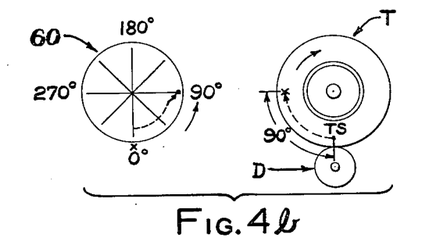

Referring to FIGS. 4, 4a and 4b, the rotating trace will be briefly explained. It will be noted that the deflection yoke 77 rotates in the direction opposite to that of the tire rotation during the test but at the same rotational speed. In beginning the test, a known spot on the tire, indicated at $x$ in the figures, is placed upon the tire at a location in alignment with the axis of the drum. This may be the serial number of the tire, for example. During the test, the reference point $x$ moves away from the drum in a clockwise direction as indicated at the right of FIG. 4a and in FIG. 4b. Simultaneously, the trace is indicated by a dot on the oscilloscope face which trace moves in a counterclockwise direction. The reference point on the oscilloscope face corresponding to the reference point $x$ on the tire is a fixed point on the oscilloscope at the zero degree point. Referring to the right of FIG. 4a, assuming that there is a thump spot indicated at TS that is disposed 90° counterclockwise from the reference point, then when the tire has been rotated clockwise to a point 90° from its initial position, the thump spot TS will be over the drum as indicated at the right of FIG. 4b. Simultaneously, the spot caused by the electron beam of the oscilloscope will have rotated 90° in a counterclockwise direction and thus will appear at the 90° scale mark engraved on the oscilloscope screen. At this point the spot will have been radially displaced due to the thump signal, so that reference to the oscilloscope scale shows that the thump spot is 90° counterclockwise from the reference point $x$ on the tire just as it occurs on the tire. Thus by rotating the deflection yoke at the same speed as, but in the opposite direction from the rotation of the tire, the deflection of electron beam caused by a thump signal will always give a trace which gives an indication of the location of the signal of the thump spot relative to the predetermined reference mark on the tire.

*Setting Up and Using the Apparatus*

Figure 5:
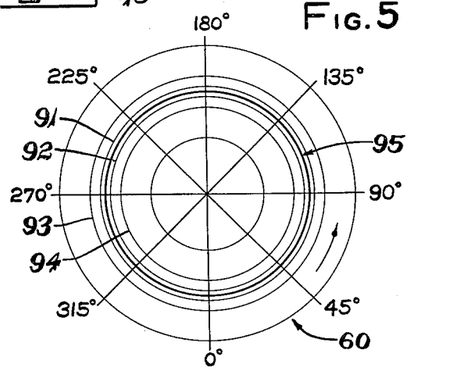
FIG. 5 is a representation of the face of the oscilloscope showing the graduations on the face and a zero signal polar trace.

It is a feature of the apparatus of my invention that the calibration can be checked and recorded, as can the results of each test. In order to present the procedure a series of typical traces on the oscilloscope screen are included in the drawings. FIG. 5 shows the graduations on the oscilloscope face and at about the mid zone of the working area of the screen is engraved a pair of concentric circles 91 and 92. To each side of these circles is another pair of concentric circles 93 and 94 which represent about the maximum signal amplitude normally encountered. The zero signal trace is formed by disconnecting the signal amplifier input, rotating the deflection yoke and adjusting the D.C. circle size control voltage giving the centered circular trace shown at 95.

The next step is to calibrate the signal amplifier so that it will always give a trace of a given amplitude on the screen for a given signal voltage. This is done by placing the calibration switch 69 in the "calibrate" position and adjusting the A.C. calibration potentiometer 68 until a sine wave signal appears on the screen as seen in FIG. 6 wherein the sinusoidal trace 97 is exactly confined between the inner pair of circles 91 and 92.

Figures 6, 7, 8, 9, 10:
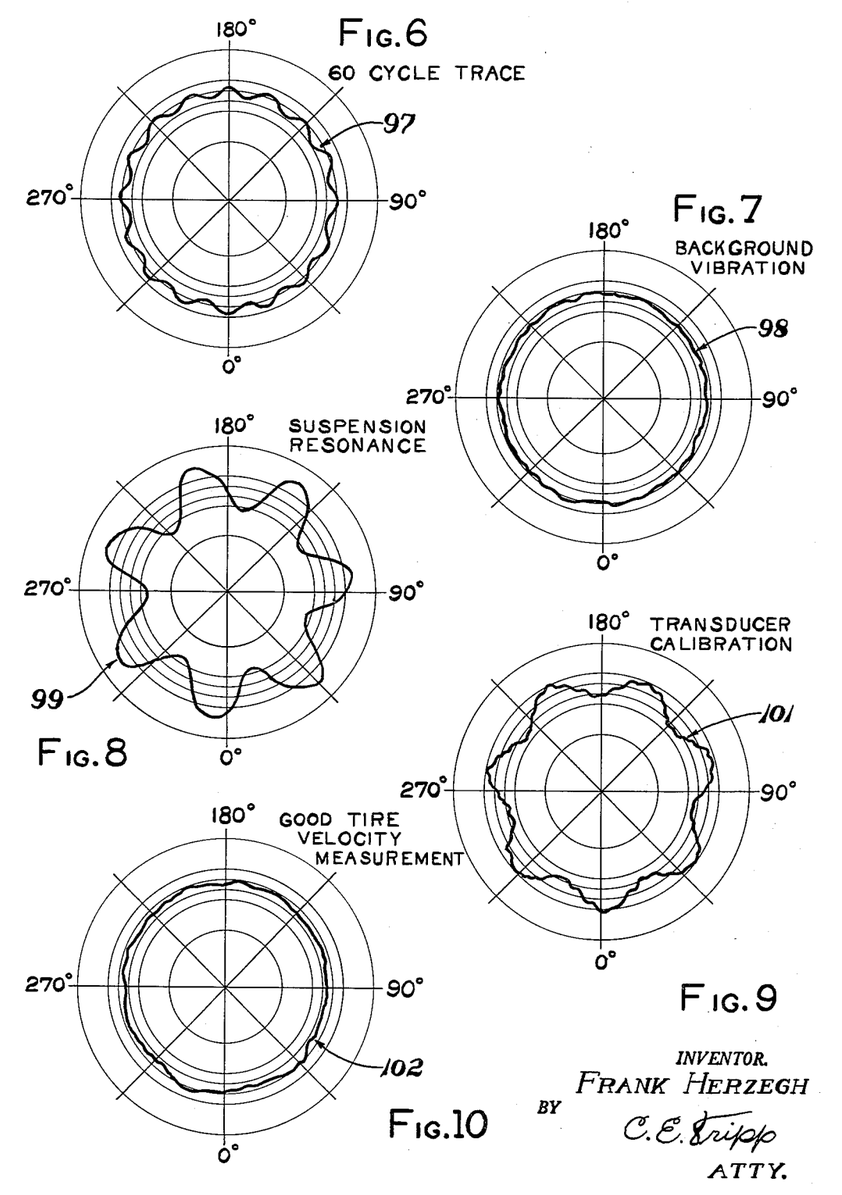
FIG. 6 shows a 60 cycle amplifier calibration trace.
FIG. 7 shows the trace due to background vibration caused by the operation of the drive motor with the tire barely in contact with the road drum.
FIG. 8 is a trace of the suspension signal at its resonant frequency.
FIG. 9 shows a trace employed for calibrating the transducer (loud speaker)
FIGS. 10 and 11 are traces generated by two tires, FIG. 10 showing the tire having excellent characteristics and FIG. 11 showing the tire having poor characteristics; namely, severe thump.

In order to check to see that the machine itself is not introducing spurious thump indications of a magnitude sufficient to invalidate testing, a back-ground vibration trace 98 is applied as seen in FIG. 7. This trace is obtained by switching the calibration switch to the transducer via the signal amplifier and starting up the drive motor, there being no tire mounted on the hub. The radial deviations of the background trace are relatively slight as can be seen in FIG. 7 and this trace gives some indication of what can be expected of a perfect tire.

Before proceeding with the test, it is important to select a suitable speed of tire rotation. One of the factors effecting selection of this speed is that of the resonant frequency and its harmonics inherent in the suspension. This apparatus provides a ready means for determining this. A motor-driven variable speed drive turning an eccentric weight is mounted on the lower wishbone of the suspension and a tire was mounted on the hub. Then the tire is rotated in order to give a trace, the speed of tire rotation for this test is not critical and a speed of about 150 r.p.m. was selected. The signal from the transducer is observed on the screen and the speed of the rotating eccentric weight adjusted until a standing wave type of trace 99 shown in FIG. 8 was obtained. This indicates that the suspension is now being excited at its resonant frequency, and since the amplitude of the trace is at a maximum it indicates that this is the fundamental resonant frequency of the suspension, which frequency can be found by knowing the rotational speed of the eccentric weight or by supplying an A.C. signal of known frequency to the oscilloscope through the calibration switch while tire rotation is being maintained. The resonant frequency represented by the trace 99 of FIG. 8 can be calculated and it turned out to be 18 cycles per second at 153 r.p.m. of the tire. Comparing this to the effect of a single exciting thump spot on a tire, such trace would be produced by a tire rotating at over 1,000 r.p.m., which with the average size passenger car tire would represent a road speed of about 90 miles for the fundamental and 45 miles an hour for the first harmonic of the suspension resonant frequency. It is important to make the test at a rotational speed wherein the frequency of thump indications is well below the resonant frequency of the suspension, and hence a speed corresponding to about 17 miles an hour road speed, or 225 r.p.m. of tire rotation was selected. The application of a 60 cycle calibrating signal to the apparatus with the tire rotating at a speed of 225 r.p.m. has been given in FIG. 6.

It is desirable that means be provided to check the transducer output both to see that it remains constant and to enable transducers to be changed in service. In order to do this a transducer was separately driven by an auxiliary drive, through an adjustable speed mechanism with a peak to peak displacement of .010 inch at 1,000 cycles per second. This gave the trace of 101 indicated on FIG. 9 which was photographed and kept as a calibration record for the apparatus. This procedure also makes possible checking the effect of oil viscosity on transducer output and a series of tests using various weight oils from SAE 20 to 80 proved that the effect of oil viscosity within this range were negligible. This is of importance in locations where temperature changes can be expected.

After having performed the preliminary checks and calibrations the machine is ready for use. The apparatus is quite stable if it is properly constructed and designed, and these checks and calibrations need not be performed frequently. The tire to be tested is mounted on the hub and inflated to 35 p.s.i. and the jack is retracted so that the weight on the frame presses the tire against the drum. The tire is loaded to bear a weight of about 1050 pounds, which with a 10" diameter drum produces a tire deflection comparable to that prescribed by the Tire & Rim Association Inc. for road service. The drum drive is started and the electronic unit turned on, the trace being observed to see that it falls within the expected zone on the oscilloscope face. The apparatus is allowed to run for a short time so that it comes into a state of equilibrium as indicated by persistent overlap of successive traces, the persistence of the screen being such that this can be checked through at least part of one revolution. The transducer measures the velocity of tire axis displacement which shows up on the screen as a radial displacement of the electron beam. The amount of radial displacement that indicates a thump effect ranging from excellent to poor can be determined with a little experience when the same tires are evaluated by ride tests. A trace 102 of FIG. 10 is that of the tire which was found in ride tests to be virtually free of thump. Experience enables the operator to evaluate the curves and assign arbitrary rating marks to the tires based on the curves. For example, a tire exhibiting the trace of FIG. 10 could be classed as a grade 1 or excellent tire.

Figures 11, 12, 13, 14, 15:
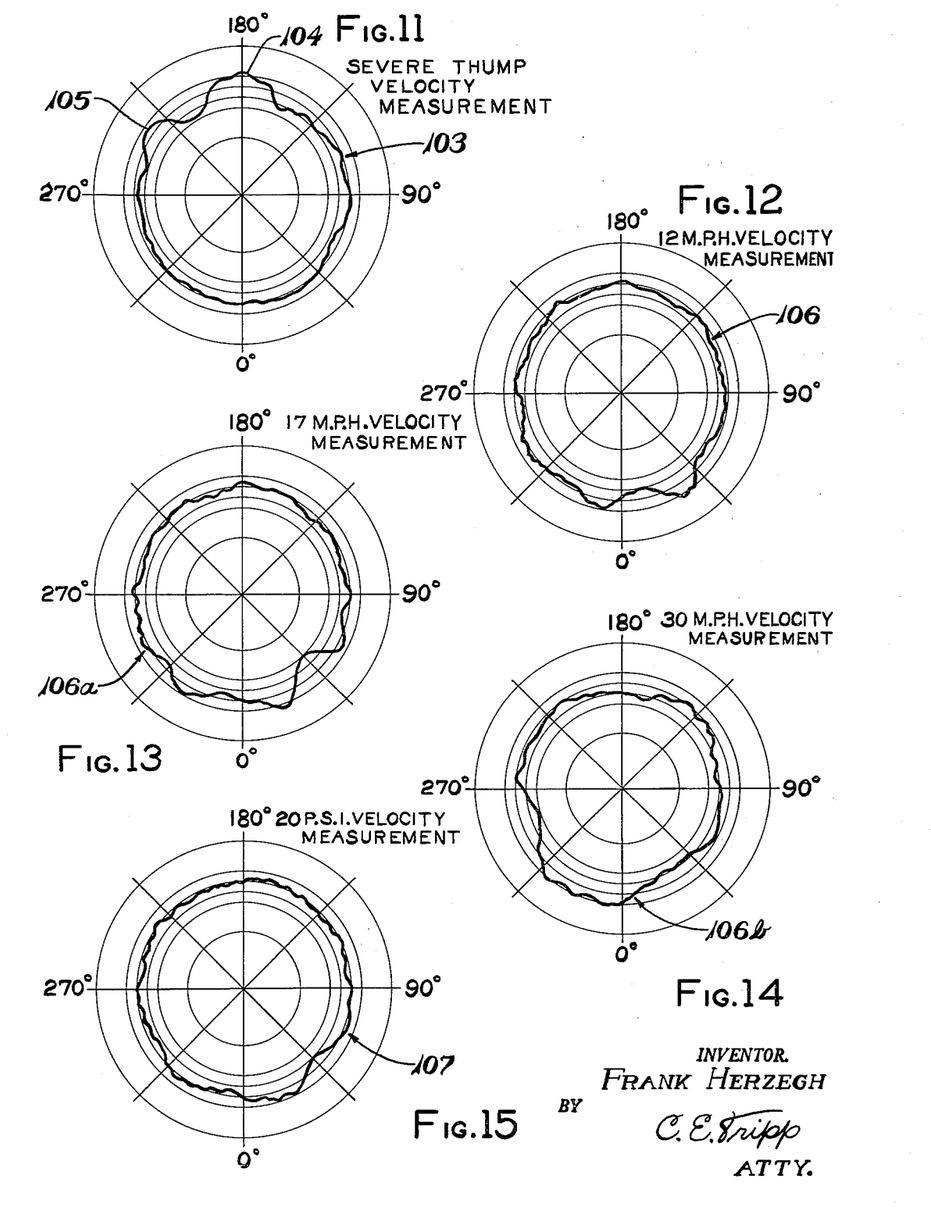
FIGS. 12, 13 and 14 are traces of the same tire at speeds of 12, 17 and 30 m.p.h. respectively.
FIGS. 15, 16 and 17 are traces of the same tire at various inflation pressures; namely, 20, 35 and 50 p.s.i. respectively.

FIG. 11 shows a trace of a tire having severe thump characteristics as evidenced by trace 103. Here two thump spots 104 and 105 are revealed. It will be noticed that the approach to the maximum displacement of these thump zones as well as the decline therefrom are steep, and since the maximum displacement of these spots is a measure of velocity of the tire axis, the steepness of the approach indicates the acceleration of the axis. This combination of high acceleration and high velocity indicate a severe high localized thump zone. A ride test of this tire would reveal a pronounced thump that is unmistakable.

The Effect of Factors Other Than Thump

It is apparent that a highly desirable characteristic of a thump indicating apparatus is that of being insensitive to tire disturbances not directly attributed to thump, and the apparatus of this invention has this desirable characteristic.

As mentioned, the test should be run at thump speeds well removed from the resonant frequency of the suspension, which with the suspension employed is 18 cycles per second corresponding to about 90 miles an hour for the fundamental and 45 miles an hour for the first harmonic. In FIGS. 12–14, three traces 106, 106a and 106b resulting from a test of the same tire run at different speeds are shown. These speeds are 12 m.p.h., 17 m.p.h., and 30 m.p.h., respectively. It will be noted that the 12 and 17 m.p.h. traces are very similar. However, at the speed corresponding to 30 m.p.h. the thump effects are partially masked by other vibrations, probably harmonics of the suspension frequency. Although a useful speed range is afforded, a selected speed corresponding to about 17 m.p.h has been found to be suitable and this lies in the speed range where thump is known to be quite objectionable to a car operator.

Figures 16, 17, 18, 19, 20:
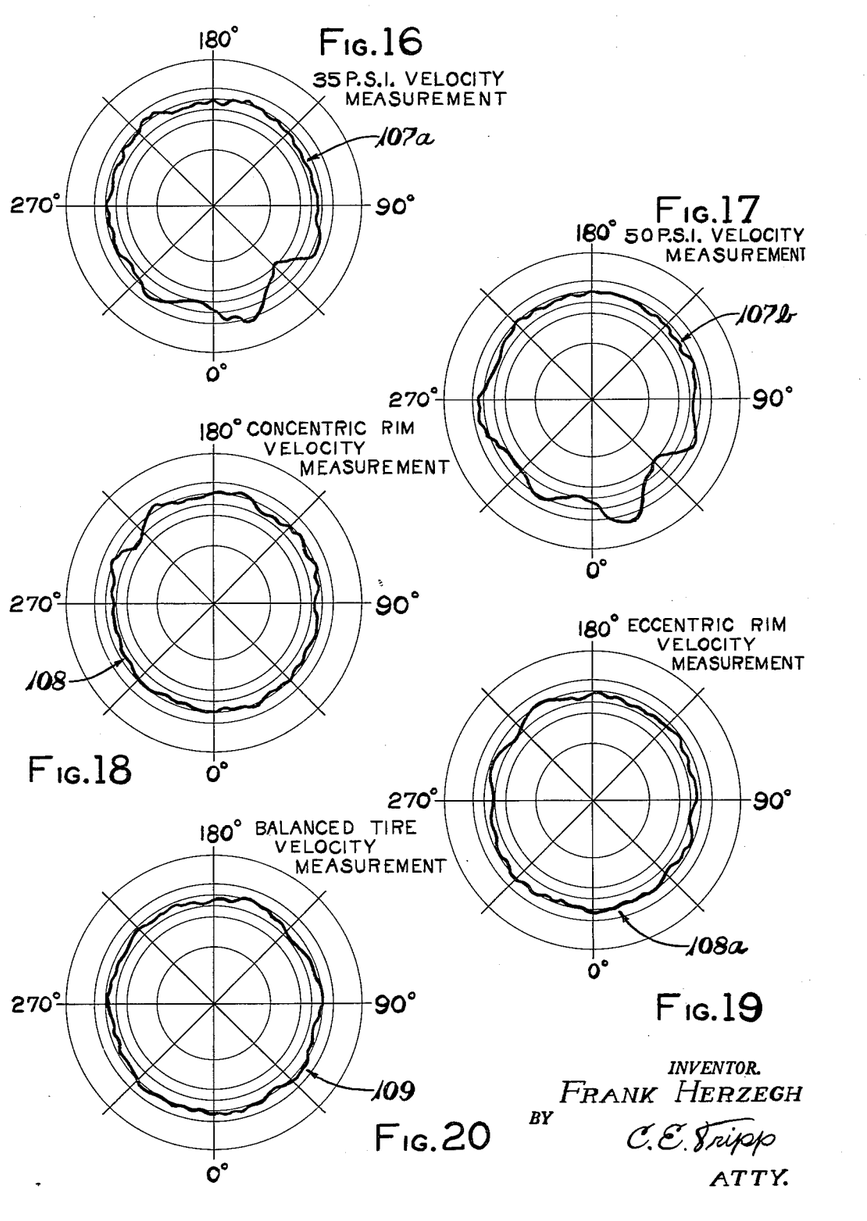
FIGS. 18 and 19 show the effect on the trace of rim eccentricity, FIG. 18 being a trace made with a tire mounted on a concentric rim and FIG. 19 being a trace of the same tire mounted on an eccentric rim.
FIGS. 20 and 21 show the effects on the trace of wheel and tire assembly unbalance, FIG. 20 showing a balanced assembly and FIG. 21 an assembly that is badly out of balance.

FIGS. 15–17 show that test results are relatively independent of tire inflation pressure within a wide range. Traces 107, 107a and 107b of these figures were made at pressures of 20 p.s.i., 35 p.s.i. and 50 p.s.i., respectively. It will be noted that the traces are quite similar as mentioned, the tests now being run by applicant's assignee are at a pressure of 35 p.s.i. which with a 10" diameter drum and a load of 1050 lbs. gives a tire deflection and effective rolling radius close to that specified by the Tire & Rim Association, Inc. handbook.

As mentioned, there have been field reports which confuse the effects of unbalance with thump and attempts in the field to correct thump effects by balancing the wheels persists although such attempts are usually unsuccessful.

Figures 21, 22, 23, 24, 25:
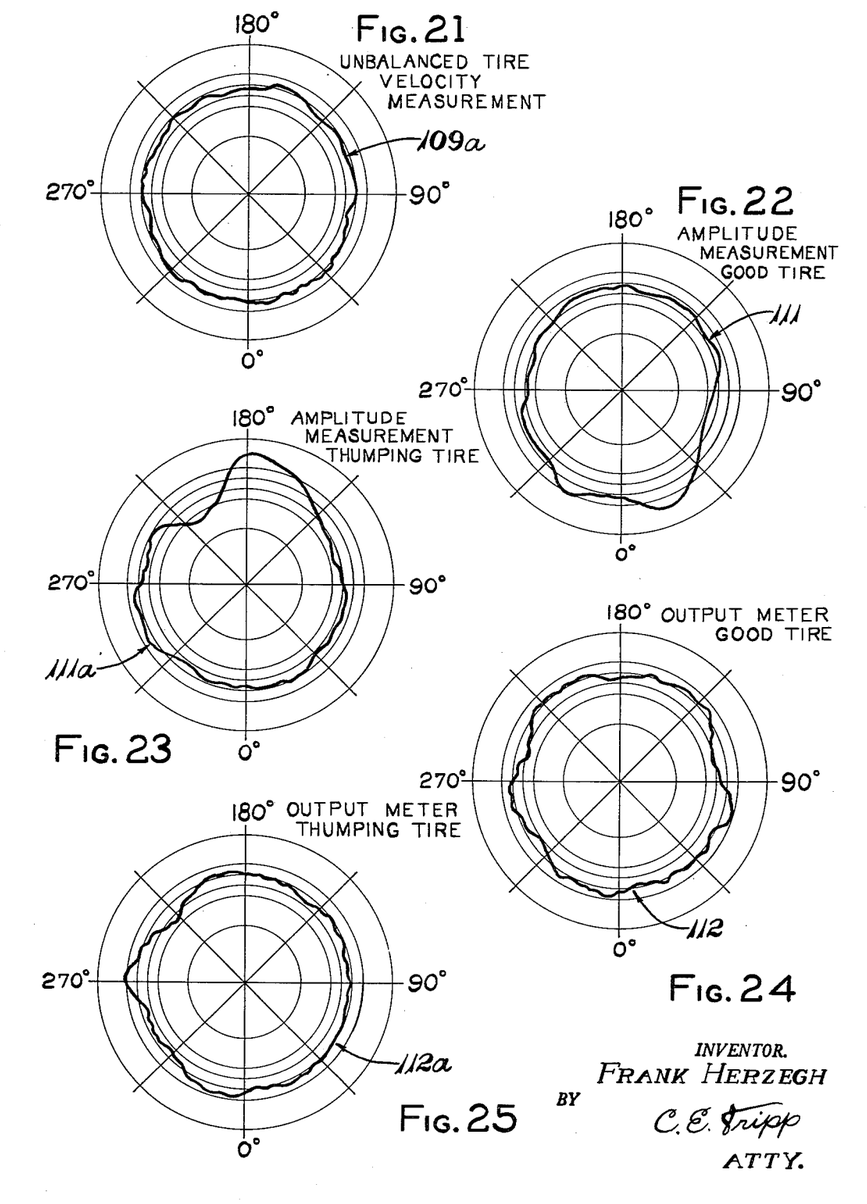
FIGS. 22 and 23 show traces made by measuring the amplitude of displacement rather than the velocity of displacement of the tires of FIGS. 10 and 11 respectively.
FIGS. 24 and 25 show the traces of two tires, one good and one bad, that give virtually the same voltage readings on an output meter showing the lack of correlation between the output meter readings and the true tire condition.

FIGS. 20 and 21 are traces of the same tire under different balance conditions. The trace 109 of FIG. 20 is made with a tire mounting having very good thump characteristics and with the wheel and tire assembly placed in very good balance. The trace 109a of FIG. 21 was made with the same tire but here the wheel had been placed out of balance in the amount of 150 inch-ounces. It will be noted that the traces of FIGS. 21 and 22 are virtually identical, proving that the device is insensitive to normally encountered unbalance, as is desired. This is another advantage of the velocity responsive device, which being quite insensitive to a gradual radial displacement such as is caused by unbalance, is yet very sensitive to the rapid radial displacement which actually causes the annoyance of thump.

There have also been attempts to cure tire thump by changing wheels or rims that have been found to be somewhat eccentric. The apparatus of my invention indicates that normal eccentricity of the rim does not produce thump and this has been correlated with actual ride tests.

FIGS. 18 and 19 show traces 108 and 108a made from the same tire mounted on different rims. The rim of FIG. 18 was checked and found to be within the commercial limits set by the Tire and Rim Association, Inc. The tire had a relatively small degree of thump as indicated by the trace but when the tire was mounted on the rim forming the trace of FIG. 20, the thump indication remained virtually the same although in this mounting one bead seat of the rim had a radial runout of .075" and a radial runout of .045" was measured on the other bead seat. Again ride tests revealed that no differences in thump can be discerned between tires mounted on either of the aforesaid rims.

Correlation With Other Types of Measurements

The velocity type of measurement and displacement has been found to be the most accurate and most meaningful type of test heretofore investigated. In order to give a controlled comparison of the velocity display with a test wherein the display gives a measurement of actual quantitive radial displacement of the tire axis, the traces of FIGS. 22 and 23 were made with the oscilloscope and deflection yoke drive of the apparatus of this invention. These traces were produced by substituting a differential transformer for the velocity transducer, which transformer gave a voltage signal to the amplifier proportional to radial displacement. The trace 111 of FIG. 22 was made using the same tire as the trace 102 of FIG. 10. The trace of FIG. 10 was made with the velocity transducer and indicated the tire had excellent thump characteristics which was proven by ride tests. However, the trace of FIG. 22 made with a displacement measuring transducer using the same tire indicates a severe displacement of the trace and based on this display an excellent tire could well be condemned. The trace 111a of FIG. 23 was made with a displacement responsive device using the same tire that made the trace of FIG. 11 which FIG. 11 trace was made with a velocity responsive device and indicates a tire having very poor thump characteristics. It will be noted that the displacement responsive trace of FIG. 23 made from a badly thumping tire differs but little from the displacement trace of FIG. 22 resulting from an excellent tire, so that although the very poor tire would have been condemned by the displacement device, its signal could not be relied upon to discriminate between poor and good tires. Such discrimination is an important aspect of my invention.

It has been stated that it is desirable that a low inertia display device such as an electron beam oscilloscope be used as opposed to an output meter of the ordinary type. In order to validate this, a tire was selected that gave a trace 112 of FIG. 24 with the velocity responsive transducer of this invention. Based on experience with ride correlation, this tire could be classified as having a medium thump plus some roughness. When an output meter was employed to measure the developed voltage in this test, a reading of .85 volt was obtained. This reading is to be compared with the test on another tire indicated by the velocity trace of FIG. 25, wherein a ride test indicated that the trace 112a of this figure is that of a tire having a higher degree of thump than the tire of FIG. 24 but that the tire is otherwise relatively smooth. In other words, ride experience indicated that the tire of FIG. 25 would be considerably more objectionable in operation than that of FIG. 24, yet the output meter reading for the tire of FIG. 25 was .80 volt, which is somewhat less than the output meter reading for the better tire having the trace of FIG. 24. This indicates the lack of discrimination of an output meter display and probably accounts for failures of certain of prior proposals in the thump measuring art.

Having completed a detailed description of a preferred embodiment of my invention so that those skilled in the art may practice the same, I claim:

1. Apparatus for testing tire thump comprising a platform, a rotatable drum mounted on said platform, means to rotate said drum, a frame, a vehicle type spring suspension on said frame including a spindle, a wheel and rim rotatably mounted on said spindle for mounting an inflated pneumatic tire, means connected to said suspension for measuring the velocity of motion of said spindle relative to said platform, and means to indicate said velocity, said measuring means comprising relatively moving coil and maget elements with a flexible diaphragm connecting said elements, a container of liquid supported by said platform, said diaphragm being immersed in said liquid to generate a voltage proportional to the velocity of spindle displacement, said indicating means being substantially inertialess and giving an indication proportional to said voltage.

2. Apparatus for testing tire thump comprising a platform, a rotatable drum mounted on said platform, means to rotate said drum, a frame, a spring on said frame including a spindle, a wheel and rim rotatably mounted on said spindle for mounting an inflated pneumatic tire, electrical transducer means associated with said suspension for measuring the velocity of motion of said spindle relative to said platform in terms of voltage, and means to visually indicate said velocity comprising a polar oscilloscope, means to synchronize the polar sweep of the oscilloscope beam with rotation of said wheel, the output of said transducer being connected to said oscilloscope to radially deflect the beam in proportion to the voltage generated by said transducer, said transducer means comprising relatively movable coil and magnet elements, one of said elements being connected to move with said spindle, a flexible diaphragm connecting said elements for relative motion, and a container of liquid supported by said platform, said diaphragm being immersed in said liquid.

3. The method of evaluating the thump characteristics of a pneumatic tire comprising inflating the tire, supporting the inflated tire for rotation about its axis and for resilient displacement radially of its axis, establishing a reference point on the circumference of the tire, rotating the tire by load-bearing contact with a moving surface at a speed corresponding to a vehicle operational speed at which tire thump is observed, generating an electrical voltage proportional to the velocity of each radial displacement of the tire axis and providing a continuous visual indication representative of the amount of each of said voltages and the location of the tire producing the voltage relative to the angular position of said reference point.

4. Apparatus for determining the thump characteristics of a pneumatic tire comprising means for mounting the tire in inflated condition, means including a spring supporting the mounted tire for rotation about its axis and for resilient displacement radially of its axis, means for rotating said tire in load-bearing contact with a moving surface, a velocity responsive device connected to said tire supporting means and including means generating an electrical voltage proportional to the velocity of each radial displacement of the tire supporting means, an oscilloscope including a cathode ray tube, beam deflecting means for said tube, means for rotating said beam deflecting means in synchronism with the rotation of said tire to provide a continuous polar trace on said tube, and means applying the voltage generated by said velocity responsive device to said beam deflecting means.

5. Apparatus for determining the thump characteristics of a pneumatic tire comprising a spindle, means for mounting the tire in inflated condition on said spindle, means including a spring supporting said spindle for rotation about its axis and for resilient displacement radially of its axis, means for rotating said tire in load-bearing contact with a moving surface, a velocity responsive device connected to said spindle and including means generating an electrical voltage proportional to the velocity of each radial displacement of said spindle, an oscilloscope including a cathode ray tube, beam deflecting means rotatable about said tube externally thereof, mechanical means interconnecting said spindle and deflecting means operative to rotate the latter in synchronism with rotation of the tire to thereby provide a continuous polar trace on said tube, and means applying the voltage generated by said velocity responsive device to said deflecting means.

6. Apparatus for testing tire thump comprising a platform, a rotatable drum mounted on said platform, means to rotate said drum, a frame, a suspension on said frame including a spindle pivotally mounted on said frame and spring means between said spindle mounting means and frame, a wheel and rim rotatably mounted on said spindle for mounting an inflated pneumatic tire in contact with said drum, means connected to said suspension for producing an electrical signal proportional to the velocity of each motion of said spindle relative to said platform radially of the axis of said spindle, and substantially inertialess electrically responsive indicating means connected to said signal-producing means to continuously indicate the velocity of each motion of said spindle radially of its axis.

7. The method of evaluating the thump characteristics of a pneumatic tire comprising resiliently supporting the tire for rotation about its axis in inflated condition with the axis of the tire capable of radial displacement, rotating the tire at a speed productive of thump by placing the periphery of it in load-bearing contact with a moving surface, generating an electrical voltage proportional to the velocity of each radial displacement of the tire axis while the tire is rotating, and providing an individual indication of the amount of each of said voltages.

8. Apparatus for testing tire thump comprising a platform, a rotatable drum mounted on said platform, means to rotate said drum, a frame, a vehicle type spring suspension on said frame including a spindle, a wheel and rim rotatably mounted on said spindle for mounting an inflated pneumatic tire in contact with said drum, an electrical transducer connected to said suspension for generating a voltage proportional to the velocity of each motion of said spindle relative to said platform and transversely of the axis of said spindle, and means to continuously visually indicate said velocity in correlation with the position of the wheel when the voltage is generated comprising a polar oscilloscope with the output of said transducer connected to said oscilloscope to radially deflect the beam in proportion to each voltage generated by said transducer and means to synchronize the polar sweep of the oscilloscope beam with rotation of said wheel.

9. Apparatus for testing tire thump comprising a rotatable drum, means to rotate said drum, a frame, a wheel suspension on said frame including a spindle pivotally mounted on said frame and spring means between said spindle mounting means and frame, a wheel and rim rotatably mounted on said spindle for mounting an inflated pneumatic tire in contact with said drum, voltage generating means connected to said suspension operative to generate a voltage proportional to the velocity of each motion of the spindle radially of the axis of said spindle, an electrical oscilloscope, means responsive to rotation of said wheel and rim connected to said oscilloscope to provide a trace thereon representative of the angular position of a known region of said tire, and means connecting said voltage generating means to said oscilloscope to deflect said trace in response to each generated voltage.

References Cited in the file of this patent

UNITED STATES PATENTS

| | | |
|---|---|---|
| 2,130,122 | Dybvig | Sept. 13, 1938 |
| 2,618,971 | Herzegh | Nov. 25, 1952 |
| 2,695,520 | Karsai | Nov. 30, 1954 |
| 2,869,362 | Gough et al. | Jan. 20, 1959 |
| 2,914,940 | Elliott et al. | Dec. 1, 1959 |
| 2,920,481 | Hulswit et al. | Jan. 12, 1960 |